United States Patent [19]

Ludman et al.

[11] Patent Number: 4,563,057
[45] Date of Patent: Jan. 7, 1986

[54] FIBER OPTIC CABLE CONNECTOR

[75] Inventors: Jacques E. Ludman, Westford; Joseph L. Horner, Cambridge; Henry J. Caulfield, Nagog Woods, all of Mass.

[73] Assignee: The United States of America as represented by the Secretary of the Air Force, Washington, D.C.

[21] Appl. No.: 413,295

[22] Filed: Aug. 31, 1982

[51] Int. Cl.$^4$ ............................................. G02B 5/14
[52] U.S. Cl. .............................. 350/96.18; 350/96.21
[58] Field of Search ............... 350/96.15, 96.18, 96.21

[56] References Cited

U.S. PATENT DOCUMENTS

| | | | |
|---|---|---|---|
| 3,584,779 | 6/1971 | Kessler | 350/96.18 |
| 3,912,364 | 10/1975 | Hudson | 350/96.18 |
| 3,975,082 | 8/1976 | Winzer | 350/96 C |
| 4,057,319 | 11/1977 | Ash et al. | 350/96 C |
| 4,128,302 | 12/1978 | DiVita | 350/96.18 |
| 4,183,618 | 1/1980 | Rush et al. | 350/96.18 |
| 4,213,677 | 7/1980 | Sugimoto et al. | 350/96.18 |
| 4,239,329 | 12/1980 | Matsumoto | 350/96.15 |
| 4,484,795 | 11/1984 | Byron | 350/96.15 |

FOREIGN PATENT DOCUMENTS 2908105 9/1980 Fed. Rep. of Germany .
1429843 3/1976 United Kingdom .

OTHER PUBLICATIONS

Midwinter, J. E., *Optical Fibers for Transmissions*, J. Wiley and Sons, New York, 1979.
*Optical Fiber Telecommunications*, S. E. Miller and A. G. Chynoweth editors, Academic Press, New York, 1979, pp. 485-490.
Leite, A. M. P. P. et al, "Optical-Fibre-Bundle Holographic Coupler", *Microwave, Optics and Acoustics*, Mar. 1978, vol. 2, pp. 45-53.

Primary Examiner—William L. Sikes
Assistant Examiner—Robert E. Wise
Attorney, Agent, or Firm—Donald J. Singer; Jacob N. Erlich

[57] ABSTRACT

A fiber optic cable connector for coupling together a pair of optical fibers having a pair of fixtures, each of the fixtures securing therein a respective optical fiber and having a magnification lens optically aligned with the end of the optical fiber. The lenses and fibers are so positioned relative to each other so as to focus a magnified or enlarged image of the end of each of the fibers to a predetermined position. A fastening means is utilized to removably attach the fixtures together in such a manner that the positions of the enlarged images of the fibers overlap thereby achieving excellent coupling of the adjacent fiber optic ends.

10 Claims, 6 Drawing Figures

FIBER OPTIC CABLE CONNECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optic couplers, and, more particularly, to a coupler which is capable of connecting two optical fibers together in a manner which is both optically efficient and substantially immune to various types of misalignment.

In recent years optical fibers have proved to be highly successful in the transmission of light in optical communication systems. Such systems can be broadly classified as either multimode or single mode, according to the type of optical fiber employed. Generally, it has been determined that the single mode system offers advantages such as higher transmission capacity and appropriate compatibility with integrated optical circuitry over multimode systems.

Unfortunately, great difficulty is generally incurred when coupling or connecting adjacent optical fibers together under field conditions. Such difficulty results from the misalignment of the minute diameter (a few microns for a monomode fiber) light guiding cores of adjacent fibers. Consequently, numerous companies have been involved in the development and/or manufacture of optical couplers or connectors which attempt to solve these alignment problems.

Basically, there are two quite separate design criteria associated with the coupling of optical fibers: (1) the design of an optical system which maximizes the tolerance of a connector or coupler to mechanical misalignment (i.e. which minimizes the insertion loss increment due to mechanical misalignments), and (2) the design of a mechanical connector or coupler which minimizes misalignment. Stated more succinctly, the objectives in designing a connector or coupler for field use, in particular, are first to provide for good mechanical alignment between the fibers and then to make sure that there are minimal losses associated with the residual misalignments. In general, there are three types of misalignments: (1) lateral; (2) axial or longitudinal; and (3) angular.

To date, the dominant optical designs have been either the butted fibers as described by J. E. Midwinter in *Optical Fibers for Transmission*, J. Wiley and Sons, New York, 1979 or the collimated beam coupler as described by O. D. D. Soares in an article entitled "Holographic Coupler for Fiber Optics", Optical Engineering, September/October 1981, Vol. 20, No. 5.

The usual approach to fiber coupling is the butted end coupler which leads to the interconnection of the fibers by careful preparation of the fiber end faces and by using micropositioning devices to bring the fiber into angular, lateral and axial alignment. Unfortunately, the requirement for stringent alignment results in connectors which are primarily capable of use in a laboratory and which are unlikely to be reproducible. In addition, since the butted fiber arrangement requires precise mechanical alignment and is particularly sensitive to lateral displacement, this type of connector is almost completely useless in field applications. For example, a lateral displacement equal to the fiber core diameter can result in complete loss of transmitted signal through the connector or coupler.

The collimated beam connector design, although substantially successful in avoiding sensitivity to lateral displacement, is generally very sensitive to angular misalignment. For example, if the angular misalignment of the fiber cores equals or exceeds the ratio of the optical fiber core diameter to the focal point of the collimating lens, then the signal is totally lost at the coupler or connector. Consequently, the collimated beam connector is less than acceptable in field applications.

It is therefore clear, that it is essential to provide a connector or coupler for optical fibers which is substantially immune to various types of misalignment problems and which can be reliably and efficiently used in the field.

SUMMARY OF THE INVENTION

The present invention overcomes the problems encountered in the past and as set forth hereinabove by providing an optical fiber connector or coupler which can be viewed as a desirable compromise between the butted fiber connector and the collimated beam connector and which is both optically efficient and substantially immune to various types of misalignment.

Making up the optical fiber connector of this invention are a plurality of mechanical and optical components utilized in combination to successfully join together the ends of adjacent optical fibers. In practice, and stated simply, the present invention provides a connector which butts together enlarged images of the ends of adjacent fibers.

More specifically, during manufacture of the present invention, each fiber end is precisely aligned with an imaging lens located within an end fixture. In use in the field the pair of substantially identical end fixtures are then joined together by a locking arrangement in such a manner as to constitute an efficient and reliable coupling between the fibers. The end fixtures, including the fibers, are firmly held in mutual alignment by the locking arrangement. The positioning of the lenses are such as to form a magnified image of each fiber end in space. When the fibers are joined by the connector of this invention, the fiber end images overlap at a predetermined position within the connector to achieve excellent coupling.

The result of such an arrangement is a reduction, relative to a butted fiber connector, in sensitivity to lateral and longitudinal displacements, and a slight increase in sensitivity to angular misalignment. With respect to the collimated beam coupler, the present invention offers decreased angular sensitivity and slight increased sensitivity to lateral and longitudinal displacements. However, a comparison of the sensitivity to overall displacements or misalignments, clearly makes the present invention superior to prior attempts at optical coupling.

It is therefore an object of this invention to provide an optical fiber connector which is optically efficient in the connection of adjacent optical fibers and largely immune to various types of fiber misalignment.

It is another object of this invention to provide an optical fiber connector which can be readily used in the field.

It is a further object of this invention to provide an optical fiber connector which relies upon overlapping images of the fiber ends for coupling of adjacent fibers.

It is still a further object of this invention to provide an optical fiber connector which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
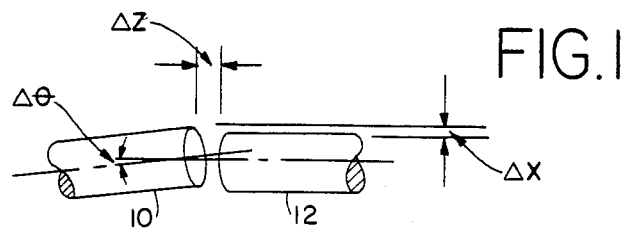
FIG. 1 is a pictorial representation of the various types of optical fiber misalignment.
Figure 2:
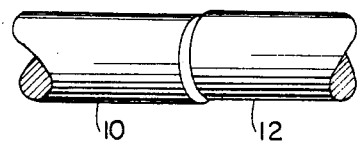
FIG. 2 is a pictorial representation of a butted end coupler found in the prior art.
Figure 3:
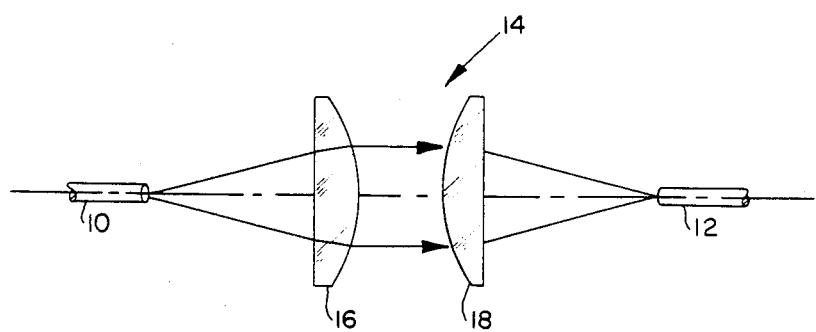
FIG. 3 is a schematic representation of a collimated beam coupler found in the prior art.

Before setting forth in detail a description of the present invention, in order to better understand the concepts involved in fiber optic coupling, reference is made to FIGS. 1-3 of the drawing in order to describe and show not only the various types of misalignment parameters associated with fiber optic coupling but also to describe prior attempts to alleviate problems associated with such misalignment.

FIG. 1 depicts in pictorial fashion adjacent optical fibers 10 and 12 illustrating various optical fiber misalignment parameters. Examples of such misalignment parameters will be hereinafter referred to as follows: lateral misalignment will be denoted as $\Delta x$, axial or longitudinal misalignment will be denoted as $\Delta z$, and angular misalignment will be denoted as $\Delta \theta$.

FIGS. 2 and 3 illustrate two of the more conventional procedures utilized in the prior art and described hereinabove for coupling optical fibers together. One such system involves the butted end approach as shown in FIG. 2 of the drawing in which the ends of the fibers 10 and 12 are directly abutted to one another and held in position by suitable clamping means (not shown). Unfortunately the butted fiber arrangement as shown in FIG. 2 requires precise mechanical alignment and is particularly sensitive to lateral misalignment ($\Delta x$).

The coupling arrangement 14 shown schematically in FIG. 3 is commonly referred to as the collimated beam coupling design. Arrangement 14 utilizes collimating lenses 16 and 18 in order to couple fibers 10 and 12 together. Lenses 16 and 18 produce collimated parallel beams of light for such a coupling. Unfortunately, although the collimated beam coupling arrangement 14 substantially reduces sensitivity to a lateral misalignment ($\Delta x$) such a design is extremely sensitive to angular misalignment ($\Delta \theta$). In fact, if such angular misalignment equals or exceeds the ratio of the optical fiber core diameter to the focal length of the collimating lens then the signal which is to pass through the fibers is totally lost at the coupler.

Figure 4:
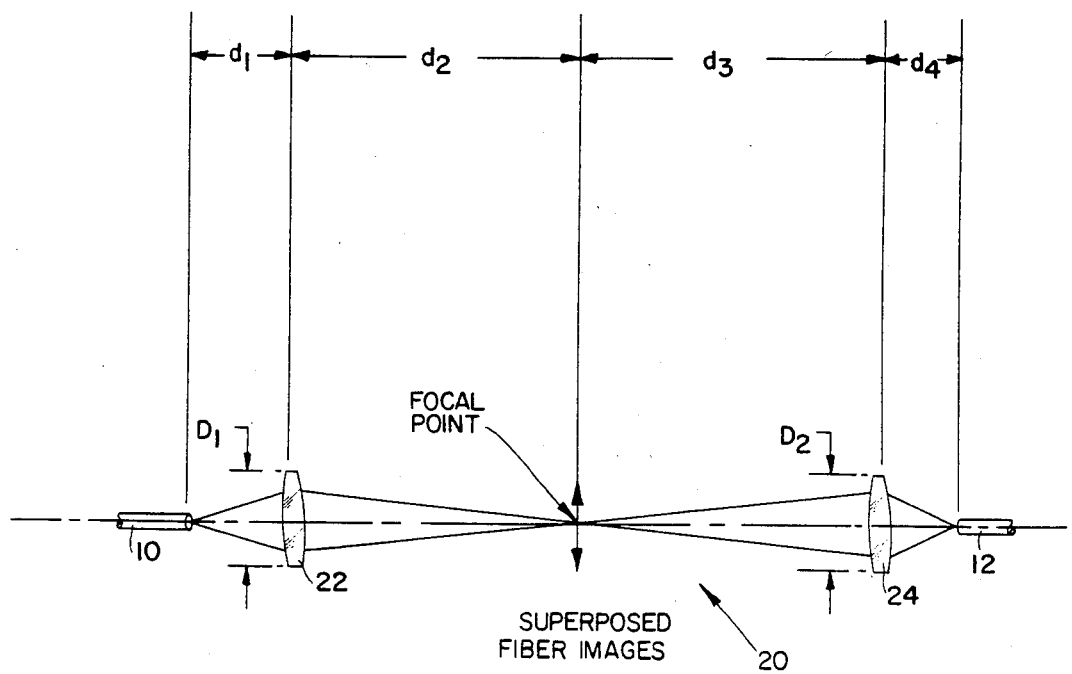
FIG. 4 is a schematic representation of the optical fiber connector of this invention.

Reference is now made to FIG. 4 of the drawing which depicts schematically the approach utilized with the optical fiber connector 20 (shown in more detail in FIG. 5 of the drawing) of the present invention for connecting optical fibers 10 and 12 together in such a manner as to substantially eliminate the problems encountered as a result of various types of fiber misalignment. The present invention relies upon the overlapping of fiber images and therefore has considerable tailorability and is therefore extremely optically efficient when used as a coupler or connector for optical fibers.

More specifically, the design of connector 20 of the present invention illustrated schematically in FIG. 4 relies upon the utilization of a pair of imaging or magnification lenses 22 and 24. Lenses 22 and 24 are positioned in predetermined locations between the ends of the fibers 10 and 12 in such a manner that enlarged images of the ends of fibers 10 and 12 are butted together at the focusing point (illustrated by the arrow in FIG. 4) of lenses 22 and 24. The present invention can be viewed as a compromise between the butted fiber concept depicted in FIG. 2 and the collimated beam concept depicted in FIG. 3 by providing a substantial reduction in sensitivity to lateral misalignment ($\Delta x$) and longitudinal or axial misalignment ($\Delta z$) with a slight increase in sensitivity to angular misalignment ($\Delta \theta$). Compared to prior coupling attempts, however, the present invention provides for an overall substantial reduction in sensitivity to the combined three areas of misalignment.

In order to accomplish an optical fiber connection with the present invention it is required that the imaging or magnification lenses 22 and 24 be selected such that the numerical aperture (N.A.) of each lens and its associated fiber are substantially equal to each other. Consequently, different sized fibers 10 and 12 can be joined together by appropriately sizing the lenses and distances between the lenses and fibers (matching N.A.).

More specifically, by defining the distances between fiber 10 and lens 22 as $d_1$, the distance between lens 22 and its focal point as $d_2$, the distance between the focal point and lens 24 as $d_3$, and the distance between lens 24 and fiber 12 as $d_4$ then a determination can be made of the appropriate numerical apertures for the lenses based upon the numerical apertures of the fibers 10 and 12. The basis of such a determination is set forth below.

Still referring to FIG. 4 of the drawing, the N.A. of a step index optical fiber having a core with an index of refraction $n_1$ and a cladding with an index of refraction $n_2$ is $$N.A. = \sqrt{n_1^2 - n_2^2}.$$

The effective N.A. of the lens (22,24) must equal or exceed the N.A. of the adjacent fiber (10,12) so that no light is lost around the lens (also referred to as "vignetting"). The N.A. of lens 22 is then given by $D_1/2d_1$ where $D_1$ is the diameter of lens 22. The same relationship applies between lens 24, the diameter $D_2$ of lens 24 and $d_4$.

The magnification of the two fibers 10 and 12 is given by $(d_1-f_1)/f_1$ and $(d_4-f_2)/f_2$, respectively, where $f_1$ and $f_2$ refer to the focal lengths of lenses 22 and 24, respectively. These two magnifications should be in the ratio of the diameter of the two fiber diameters 10 and 12. This insures that the light from the input fiber completely fills the output fiber. Once the diameter and the N.A. of the two optical fibers to be coupled are specified the above considerations determine the selection of the lenses and distances of the coupling device of this invention.

Figure 5:
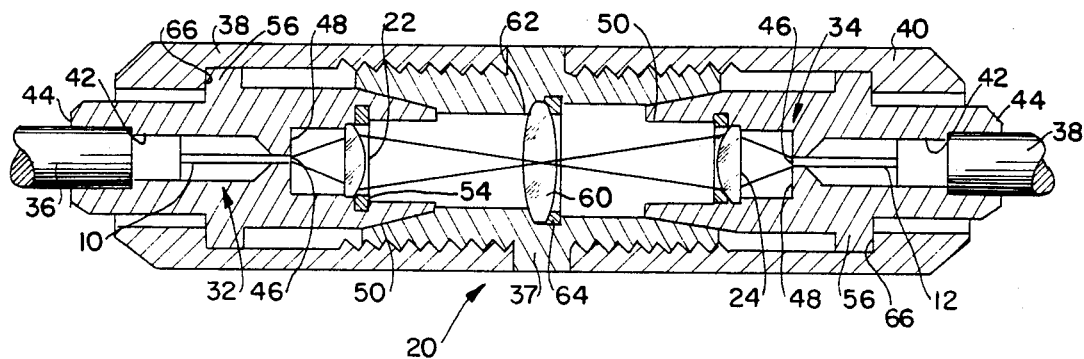
FIG. 5 is a side elevational view, shown partly in cross section, of the preferred embodiment of the optical fiber connector of this invention.

Reference is now made to FIG. 5 of the drawing in order to continue the description of connector 20 and the manner in which lenses 22 and 24 and fibers 10 and 12 are held in the appropriate relationship to one another. FIG. 5 clearly shows in a cross sectional view optical connector 20 of this invention. As illustrated in this embodiment of the invention, connector 20 is made up of a plurality of removable components. More specifically, optical fiber connector 20 is made up of a pair of end fixtures 32 and 34, which during manufacture of connector 20 have fixedly secured therein an end of an optical fiber 10 and 12, respectively, emanating from cables 36 and 38. In addition to end fixtures 32 and 34, connector 20 includes a locking arrangement in the form of central preferably annular-shaped support housing 37 and a pair of retainers 38 and 40.

Reference is now made in particular to each end fixture 32 and 34. End fixtures 32 and 34 are made substantially identical to each other with only the internal configurations thereof being sized differently to accommodate different sized fibers and cables, if so desired. For simplicity, therefore, the following description will refer to only one fixture 32 with identical reference numerals being utilized for the same structural elements associated with both fixtures 32 and 34.

Fixture 32 includes a longitudinally extending, elongated indentation 42 beginning at one end 44 of fixture 32 and terminating in an accurately sized aperture 46 at the other end 48 thereof. Indentation 42 is sized so as to fixedly secure cable 36 (38) therein while aperture 46 is sized to fixedly secure an end of optical fiber 10 (12) therein. The portion 50 of fixture 32 located adjacent aperture 46 is of an annular configuration and secures therein any suitable imaging or magnification lens 22 (24) having a numerical aperture a (N.A.) determined in the manner set forth hereinabove. Lens 22 (24) is held in position within annular portion 50 by any suitable snaping-ring fastener 54 or the like. The exterior of portion 50 surrounding lens 52 is preferably made of a conical configuration so that it may be inserted within central locking support housing 36 in a manner to be described hereinbelow.

In addition, fixture 32 has a circumferentially configured, radially extending element 56 protruding therefrom. Element 56 is utilized to engage retainer 38 in order to fixedly secure fixture 32 within support housing 37. A detailed description of fixture 34 utilized for the other cable 38 and optical fiber 12 is not set forth in detail since, as stated above, its makeup is substantially identical to the makeup of fixture 32.

By the use of the present invention, substantial cost savings can be achieved by manufacturing cables with fixtures attached thereto. The only requirement in the manufacture of connector 20 would be meeting the distance and numerical aperture requirements set forth above.

Reference is now made to the description of the central support housing 37. In the embodiment depicted in FIG. 5, housing 37 has a field lens 60 positioned within the interior of housing 37 at the focal points of lenses 22 and 24 when fixtures 32 and 34 are in position therein. As shown in FIG. 5 of the drawing the inner diameter of one end of housing 37 is slightly larger than the inner diameter of the other end in order to enable the lens 60 to be inserted against abutting edge 62 and held in place by an appropriate snap-ring 64 or the like. The external surface of housing 36 is threaded in order to mating engage with retainers 38 and 40.

Reference is now made to retainers 38 and 40 which are of identical construction and therefore the following description will be made with respect to only retainer 38. Retainer 38 has an elongated, annular configuration with a portion thereof internally threaded in order to mate with the external threads of housing 37. A lip 66 is formed on the interior of retainer 38 so as to engage outstanding element 56 on fixture 32 (34). In this manner fixture 32 (34) can be rigidly positioned within housing 37.

In use, and particularly in field use, all that is necessary in connecting the two optical cables 36 and 38 together is to insert the conical portions 50 of each fixture 32 and 34 within the central housing 37 and to fasten retainers 38 and 40 upon the threaded external surfaces of central housing 37. Prearranged sizing establishes the appropriate distance relationship between the lenses 22 and 24 and the centrally located field lens 60. With the present invention, lenses 22 and 24 provide a focusing of the enlarged images of the ends of fibers 10 and 12 to take place at substantially the midpoint of central housing 37 through field lens 50.

Thereafter in use, any light beam exiting fiber 10, for example, passes through lens 52 and is focused upon field lens 60 from where it is reimaged to focus upon lens 52 before being passed on to fiber 12. With the arrangement of the present invention exact alignment is not an absolute critical factor since the focusing of enlarged images of the fiber ends substantially reduces the sensitivity to lateral, longitudinal or angular misalignment. A comparison of the results utilizing the present optical fiber connector 20 to prior optical fiber connectors is set forth in tabular form hereinbelow substantiating the substantial reduction of misalignment error.

DETAILED DESCRIPTION OF AN ALTERNATE EMBODIMENT

Figure 6:
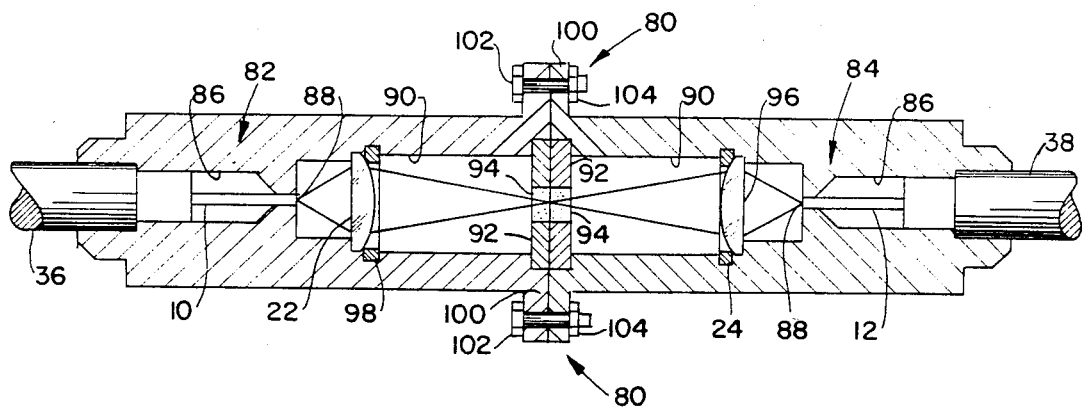
FIG. 6 is a side elevational view, shown partly in cross section, of an alternate emodiment of the optical fiber connector of this invention.

Reference is now made to FIG. 6 of the drawing which illustrates an alternate embodiment of this invention in the form of optical fiber connector 80. Optical fiber connector 80 has eliminated the need for central housing 37 shown in FIG. 5 by directly abutting end fixtures 82 and 84 together. Since end fixtures 82 and 84 are substantially identical in construction, the following description will refer to only end fixture 82, with like elements given similar reference numerals with respect to end fixture 84.

More specifically, end fixture 82 includes a longitudinally extending, elongated indentation 86 at one end of fixture 82 and terminating in an accurately sized aperture 88 approximately at the midpoint of the fixture. The remaining portion of fixture 82 is in the form of another longitudinally extending indentation 90 sealed by an aperture plate 92 having a centrally located aperture 94 therein made of any suitable transparent material.

Any suitable imaging or magnification lens 22 (24) of a numerical aperture (N.A.) determined in the manner set forth hereinabove is mounted within indentation 90 in a similar fashion to lens 22 (24) shown with respect to connector 20 in FIG. 5. A conventional snap-ring 98 securely positions lens 96 in place therein. Extending from fixture 82 adjacent the end thereof containing aperture plate 92 is a circumferential radially extending flange 100. By the abutment of flanges 100 of both fixtures 82 and 84, fixtures 82 and 84 can be brought into engagement with one another during field use and secured together by the use of any suitable fastening means such as a plurality of bolts 102 and nuts 104.

Just as with fixtures 32 and 34, fixtures 82 and 84 have cables 36 and 38 and optical fibers 10 and 12 fixedly secured in place during manufacture. In this manner, coupling of fibers 10 and 12 in the field can take place rapidly with merely the connection of fixtures 82 and 84. Operation of this embodiment is similar to the preferred embodiment set forth in FIGS. 4 and 5 provides for a substantial reduction in sensitivity to lateral, longitudinal and angular misalignment during the interconnection of optical cables and their associated optical fibers.

OPERATIVE EXAMPLE

Quantative comparisons of the alignment sensitivity of various types of designs including the present invention are provided in Tables I and II set forth hereinbelow in order to substantiate the effectiveness of the present invention. Table I defines the expressions utilized in determining the coupling losses due to lateral displacement ($\Delta x$), axial displacement ($\Delta z$), and angular displacement ($\Delta \theta$) for the butted fiber connector, the collimated beam connector and the optical fiber connector 20 (80) of the present invention.

The expressions for losses due to lateral and angular displacements ($\Delta x$, $\Delta \theta$) are approximations based upon geometrical considerations while the expression for the loss due to axial displacement ($\Delta z$) represents a fit to experimental data as found in the book entitled *Optical Fiber Telecommunications* edited by S. E. Miller and A. G. Chynoweth, Academic Press, New York, 1979, pg. 486.

TABLE I

| | OPTICAL FIBER CONNECTOR LOSSES | | |
|---|---|---|---|
| TYPE OF LOSS | BUTTED FIBER CONNECTOR | COLLIMATED BEAM CONNECTOR | PRESENT INVENTION CONNECTOR |
| Lateral Displacement | $2\Delta X/\pi R$ | $2\Delta X/\pi D$ | $2\Delta X/\pi MR$ |
| Axial Displacement | $\Delta Z(N.A.)/4R$ | Negligible | $\Delta Z(N.A.)/4RM^2$ |
| Angular Displacement | $2\Delta\theta/\pi(N.A.)$ | $2F\Delta\theta/\pi R$ | $2\Delta\theta/\pi M(N.A.)$ |

R IS THE RADIUS OF THE OPTICAL FIBER
N.A. IS THE NUMERICAL APERTURE OF THE OPTICAL FIBER
F IS THE FOCAL LENGTH OF THE LENS IN THE COLLIMATED BEAM CONNECTOR
D IS THE USEFUL DIAMETER OF THE LENS (D = 2·F·(N.A.)
M IS THE MAGNIFICATION OF THE LENS OF THE PRESENT INVENTION
$\Delta X$, $\Delta Z$ AND $\Delta \theta$ ARE THE LATERAL, AXIAL AND ANGULAR MISALIGNMENTS OR DISPLACEMENTS, RESPECTIVELY Table II set forth hereinbelow provides numerical estimates for optical fiber connector losses due to misalignments of the mating parts of the butted fiber connector, collimated beam connector and optical fiber connector of the present invention. The values chosen for the representative errors are reasonable in that the connectors are assumed to have a lateral misalignment ($\Delta x$) of 25 microns (0.001 inches) an axial misalignment ($\Delta z$) of 250 microns (0.01 inches) and an angular misalignment ($\Delta \theta$) of 0.24 (4 milliradians). This is a realistic combination of alignment errors.

TABLE II

| | NUMERICAL ESTIMATES FOR OPTICAL FIBER CONNECTOR LOSSES | | |
|---|---|---|---|
| TYPE OF LOSS | BUTTED FIBER CONNECTOR | COLLIMATED BEAM CONNECTOR | PRESENT INVENTION CONNECTOR |
| LATERAL DISPLACEMENT | 1.70 | 0.04 | 0.27 |
| AXIAL DISPLACEMENT | 1.25 | 0 | 0.04 |
| ANGULAR DISPLACEMENT | 0.04 | 3.10 | 0.27 |
| TOTALS | 2.99 DB | 3.15 DB | 0.58 DB |

ALL LOSSES ARE EXPRESSED IN DB: LOSS IN DB = $-10 \text{LOG}(1 - \text{FRACTIONAL LOSS})$
R = 50 microns
F = 10 mm
N.A. = .02
M = 5
D = 5 mm As clearly shown in Table II, the optical fiber connector 20 (80) of the present invention provides an overall substantially better coupling of optical fibers than connectors of the past and as a result is less influenced by overall misalignment problems as generally associated with fiber optical couplers of the past. Consequently, the optical fiber connector of this invention finds great applicability in field use as well as in the laboratory.

Although this invention has been described with reference to particular embodiments, it will be understood that this invention is also capable of further and other embodiments within the spirit and scope of the appended claims.

We claim:

1. An optical fiber connector for coupling a pair of adjacent optical fibers together comprising:
   first means for fixedly securing an end of a first optical fiber therein, said first optical fiber securing means having means therein optically aligned with said end of said first optical fiber for focusing an enlarged image of said end of said first optical fiber to a predetermined position;
   second means for fixedly securing an end of a second optical fiber therein, said second optical fiber securing means having means therein optically aligned with said end of said second optical fiber for focusing an enlarged image of said end of said second optical fiber to a predetermined position; and
   means for removably attaching said first optical fiber securing means to said second optical fiber securing means such that said predetermined position of said enlarged image of said end of said first optical fiber and said predetermined position of said enlarged image of said end of said second optical fiber coincide with each other when said first and said second optical fiber securing means are attached together.

2. An optical fiber connector as defined in claim 1 wherein said focusing means in said first optical fiber securing means and said focusing means in said second optical fiber securing means are both in the form of a lens, and wherein the numerical aperture of said first optical fiber is substantially equal to the numerical aperture of said lens in said first optical fiber securing means and wherein the numerical aperture of said second optical fiber is substantially equal to the numerical aperture of said lens in said second optical fiber securing means.

3. An optical fiber connector as defined in claim 2 wherein said lens is a magnification lens.

4. An optical fiber connector as defined in claim 2 wherein said means for removably attaching said first optical fiber securing means to said second optical fiber securing means comprises an annular-shaped housing, said housing having a field lens located therein at substantially said predetermined position at which said enlarged image of said end of said first optical fiber and said enlarged image of said end of said second optical fiber are focused, and said housing having means associated with each end thereof for matingly engaging and attaching thereto said first and said second optical fiber securing means, respectively.

5. An optical fiber connector as defined in claim 4 wherein an end of each of said first and said second optical fiber securing means is shaped so as to fit within each of said ends of said housing, respectively.

6. An optical fiber connector as defined in claim 5 wherein each of said means associated with each end of said housing comprises a retainer element.

7. An optical fiber connector as defined in claim 2 wherein each of said first and said second optical fiber securing means includes a transparent means for sealing an end of said optical fiber securing means opposite said optical fiber.

8. An optical fiber connector as defined in claim 7 wherein said transparent sealing means of each of said first and said second optical fiber securing means, respectively, is located at substantially said predetermined position at which said enlarged image of said end of said first and said second optical fiber are focused, respectively.

9. An optical fiber connector as defined in claim 8 wherein each of said first and said second optical fiber securing means has a circumferential, radially outstanding element situated thereon adjacent said transparent sealing means whereby said means for removably attaching said first and said second optical fiber securing means together is capable of engaging said circumferential outstanding elements.

10. An optical fiber connector as defined in claim 9 wherein said means for removably attaching said first and said second optical fiber securing means together comprises a plurality of bolts.

* * * * *